United States Patent
Hulin et al.

(10) Patent No.: US 6,480,653 B1
(45) Date of Patent: *Nov. 12, 2002

(54) METHOD OF MANUFACTURING OPTICAL FIBER CABLE AND RESULTING OPTICAL FIBER CABLE

(75) Inventors: Jean-Pierre Hulin, Pontoise; Jean-Pierre Bonicel, Rueil Malmaison, both of (FR)

(73) Assignee: Alcatel Cable, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/620,326

(22) Filed: Mar. 22, 1996

(30) Foreign Application Priority Data

Mar. 24, 1995 (FR) ............................................. 95 03492

(51) Int. Cl.⁷ .................................................. G02B 6/44
(52) U.S. Cl. .......................... 385/106; 385/100; 385/112
(58) Field of Search ................................ 385/100, 102, 385/104, 106, 109, 111, 112, 114

(56) References Cited

U.S. PATENT DOCUMENTS

| | | | |
|---|---|---|---|
| 3,881,976 A | 5/1975 | Jones | 385/114 X |
| 4,746,190 A | 5/1988 | Oestreich et al. | 385/112 |
| 4,770,490 A | * 9/1988 | Gruenewald et al. | 385/100 |
| 4,964,691 A | 10/1990 | Nelson et al. | 385/110 |
| 5,109,457 A | 4/1992 | Panuska et al. | 385/102 |
| 5,155,789 A | 10/1992 | Le Noane et al. | 385/106 |
| 5,173,961 A | 12/1992 | Chiasson | 385/112 X |
| 5,386,489 A | 1/1995 | Stokes | 385/100 |
| 5,402,516 A | 3/1995 | Blyler, Jr. et al. | 385/106 X |

FOREIGN PATENT DOCUMENTS

| | | |
|---|---|---|
| DE | 38 11 126 A1 | 10/1986 |
| DE | 35 37 553 A1 | 4/1987 |
| EP | 0 060 180 A1 | 9/1982 |
| EP | 0 468 878 A1 | 1/1992 |

* cited by examiner

*Primary Examiner*—John D. Lee
(74) *Attorney, Agent, or Firm*—Sughrue Mion, PLLC

(57) ABSTRACT

The invention relates to an optical fiber cable including an outer sheath containing a plurality of optical fibers separated into at least two optical fiber modules, each of said modules consisting of a module sheath surrounding a respective group of optical fibers. According to the invention, the module sheath is formed by a film of plastics material. The film is, for example, wrapped widthwise around the group of optical fibers, a first face of the film being superposed on and fixed to a second face of the film over a portion of given width of said film.

22 Claims, 3 Drawing Sheets

METHOD OF MANUFACTURING OPTICAL FIBER CABLE AND RESULTING OPTICAL FIBER CABLE

BACKGROUND OF THE INVENTION

In recent years, there has been major expansion in optical fiber transmission systems and it will continue in years to come, particularly in the field of telecommunications, because of the immense potential of optical fiber transmission systems in comparison with systems based on copper. For wideband service applications in distributed or switched networks, the use of optical fibers today appears technically inescapable and economically viable because of the ever decreasing cost of manufacturing optical fibers. For switched services, authorizing the interchange of information between two subscriber data terminals (visiophones), and for distributed services, where the subscriber terminal is a passive termination that does not interact with the distribution center (distributing television programmes), networks have resorted to optical fiber cables defining multiple subdivisions, or ramifications, in order to reach subscribers.

FIGS. 1 and 2 respectively show two known cable structures of the prior art. In a cross-section of the cable, an outer sheath 1 and a plurality of optical fiber modules referenced 30 to 36 can further be distinguished. Said modules define separate ducts which can be identified with a view to facilitating subscriber connections, for example, in the vicinity of the terminations of the network. Each of said modules 30–36 is in the form of a module sheath surrounding a respective group of optical fibers. In the variant of FIG. 1, the outer sheath 1 of the cable comprises two concentric sheath elements 10 and 12, respectively an inner element and an outer element, and a reinforcing sheath 13 disposed between the two sheath elements. In a variant, the reinforcing sheath 13 could be replaced by at least two longitudinal reinforcing elements uniformly distributed over the periphery of the inner sheath element 13. Sealing threads or ribbons 20, 21, 22, 23, and 24 are further provided, disposed longitudinally inside the cable. In the variant of FIG. 2, a filler material 40 fills the volume inside the outer sheath that is not occupied by modules 30–36. The invention bears on the characteristics of an optical fiber module and not on those of a cable structure, so the variants relating to the production of such a structure are not given in greater detail in the following description, but the person skilled in the art will understand that the outer sheath can take various forms, such as metal or plastics, and that modifications, additions or deletions of a known type can be applied to the structures described in FIGS. 1 and 2.

The prior art, such as recalled in European patent application EP-A-0 468 878, describes optical fiber modules having a thin module sheath in order to make them easy to tear. Each of the optical fiber modules is obtained by extruding a plastics material, such as polyethylene or polypropylene, around a group of optical fibers, in order to form the module sheath. A first drawback of such a module is that it requires an extrusion operation in order to manufacture it. A second drawback is that the quantity of material required for forming the module sheath, although considered as small specifically because of the thinness of the module sheath, nevertheless remains relatively high, with the result that the manufacturing cost of a cable is increased.

OBJECTS AND SUMMARY OF THE INVENTION

The invention seeks to remedy the above-mentioned drawbacks by providing, in particular, a method of obtaining an optical fiber module that does not require any extrusion operation. The invention further seeks to substantially reduce the quantity of material needed for forming the module sheath in comparison with known embodiments. As a consequence of the above, the invention enables the density of optical fibers in a cable to be increased. Furthermore, the invention provides a particularly advantageous optical fiber cable.

To this end, according to the invention, a method of forming a sheath for an optical fiber module, with the module being designed to form part of an optical fiber cable including an outer sheath enclosing at least two optical fiber modules each including a respective group of optical fibers, comprises the steps of:

deforming a film around said group of optical fibers; and fixing the film thus deformed around the group of optical fibers in order to surround and hold said group of optical fibers.

The deforming step, as contemplated in the present invention, encompasses tightly wrapping a pre-formed film around a group of optical fibers and excludes an extrusion procedure for encasing the fibers. The deforming step is typically preceded by the step of:

applying traction to the group of optical fibers.

In a first variant, the deforming step consists in deforming the film widthwise around the group of optical fibers, which runs under the applied traction so that a first face of said film overlaps a second face of said film over a portion of given width of the film.

In a second variant, the deforming step consists in helically taping said film around the group of optical fibers which runs under the applied traction.

The step of fixing the film deformed around the group of optical fibers is typically obtained by adhesive.

Furthermore, the film can be a heat-shrink material, in which case, the fixing step is followed by a step of heating the film so that it shrinks around the group of optical fibers.

The invention also provides a cable containing the optical fiber modules. According to the invention, in such an optical fiber cable, including an outer sheath containing a plurality of optical fibers separated into at least two optical fiber modules, with each of said modules consisting of a module sheath surrounding a respective group of optical fibers, the module sheath is formed by a film made of plastics material.

In a first variant of the invention, the film is wrapped widthwise around a group of optical fibers, a first face of said film being superposed on and fixed to a second face of said film over a portion of given width of said film. For example, the first face of the film is fixed by adhesion to the second face of the film over said portion of given width.

In a second variant, the film is taped helically around the group of optical fibers.

A film of the invention is not limited to forming one module, but can be used to constitute complex modules, i.e. groups of modules. To this end, according to the invention, an optical fiber cable including an outer sheath enclosing a plurality of optical fibers separated into at least two optical fiber modules, with each of said modules consisting of a module sheath surrounding a respective group of optical fibers, has at least one film bringing together at least two of said modules.

Alternatively, the film is wrapped widthwise around said at least two of the modules, a first face of the film being superposed on and fixed to a second face of the film over a portion of given width of the film, or the film is taped helically around said at least two of said modules.

A cable of the invention can have module identification information on an outside face of the film.

Inside the outer sheath of the cable, each of the modules can be disposed either substantially rectilinearly, or substantially helically, or even substantially in SZ manner.

The invention also envisions a complex optical fiber cable that includes at least two cables of the type described above.

BRIEF DESCRIPTION OF THE DRAWINGS

Other characteristics and advantages of the present invention appear more clearly on reading the following description, with reference to the corresponding accompanying drawings, in which.

MORE DETAILED DESCRIPTION

At present, technological evolution in the field of optical fibers makes it possible to manufacture fibers having high mechanical strength and low sensitivity to micro-stresses. Similarly, in the field of packaging, use is made nowadays of synthetic films made of plastics materials such as polyolefine, polyester, polyvinyl chloride, celluloid, etc., which are very thin while having high strength. By way of example, said films are of substantially rectangular format, are in the form of a thin layer of plastics material, and their very small thickness can lie in the range 5 $\mu$m to 150 $\mu$m. Such films can exist in the form of a composite material.

The invention takes advantage of these two considerations by providing, in particular, an optical fiber cable in which each optical fiber module in the form of a module sheath surrounding a respective group of optical fibers, is such that the module sheath is formed by a film such as a synthetic film. In comparison with a module sheath manufactured by a conventional extrusion operation, the thickness of the sheath of the invention is reduced, having a value that is typically less than 150 $\mu$m. As a result, in the production of an optical fiber cable, it is possible to obtain a higher density of fibers in a given volume because of the reduction in the volume occupied by the module sheaths.

Figure 1:
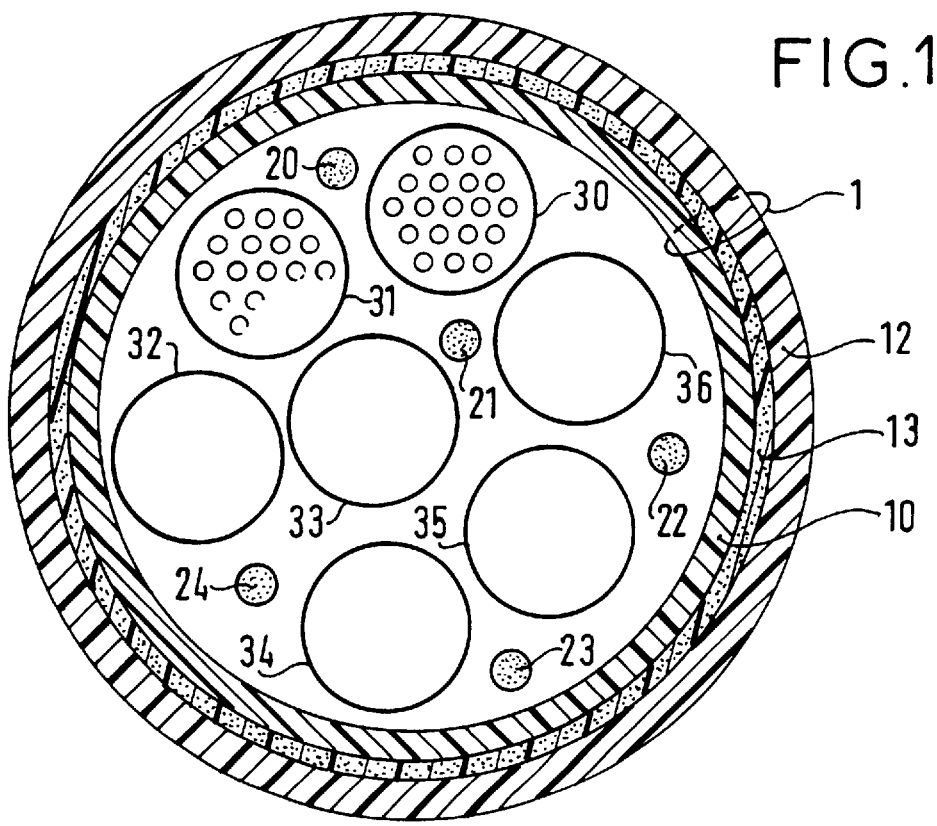
FIGS. 1 and 2 are cross-sections respectively showing two optical fiber cables of the type known in the prior art.
Figure 2:
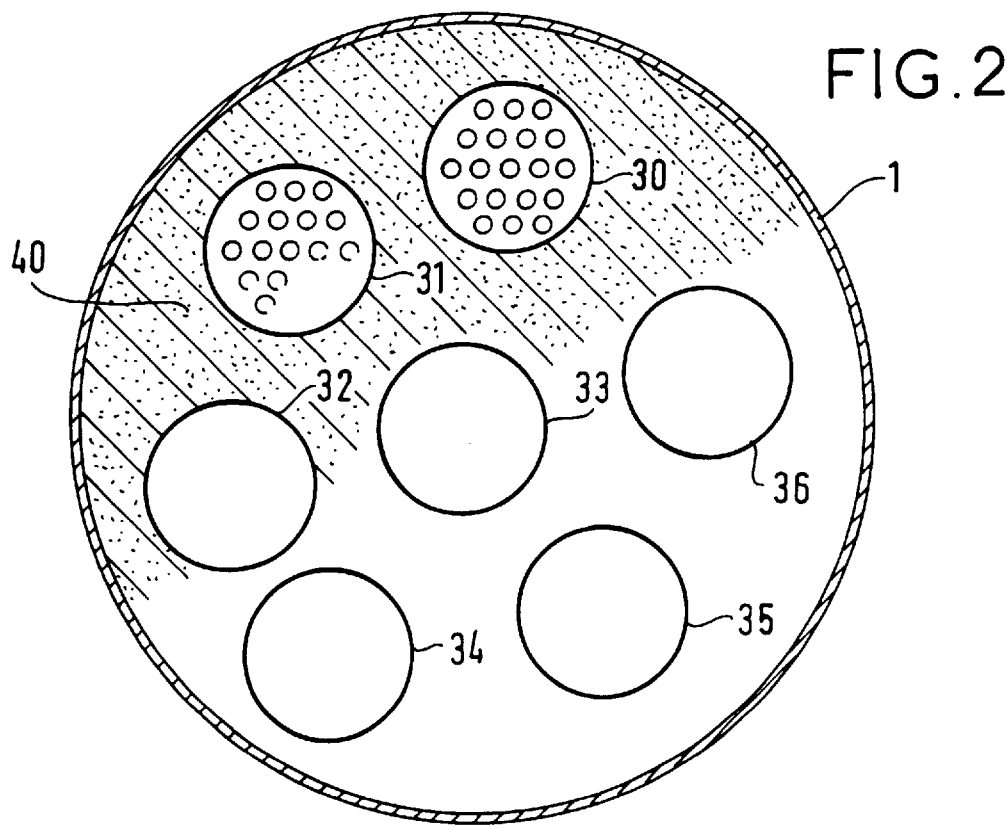
Figure 3:
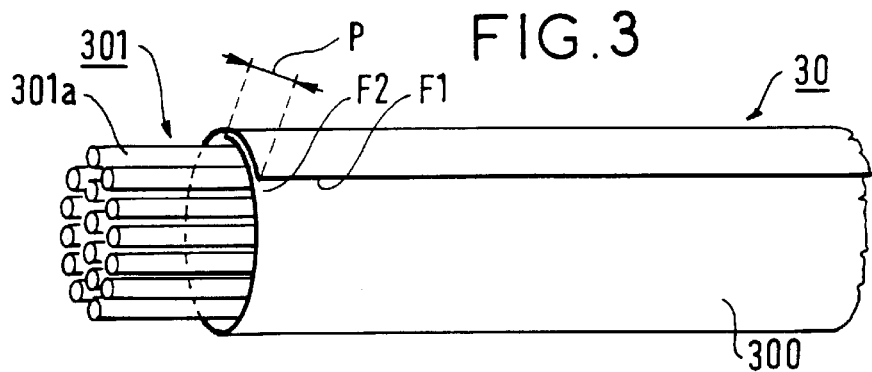
FIG. 3 shows a group of fibers in a first variant of the invention, which fibers are wrapped in a film in order to produce an optical fiber module as included in a cable of the type shown in FIGS. 1 or 2.

In a first variant of the invention, with reference to FIG. 3, an optical fiber module 30 disposed inside an inner sheath of a cable 1 of the type shown in FIGS. 1 and 2, includes a rectangular-shaped film 300 made of plastics material wrapped widthwise around a respective group 301 of optical fibers, such as fiber 301a. A first face F1 of the film is superposed on and fixed to an opposite second face F2 of the film over a portion of given width p of the film. The first face F1 is fixed to the second face F2 by adhesive, for example.

This variant is particularly advantageous in that it optimizes the area of film which is required for wrapping around the group of fibers.

Figure 4:
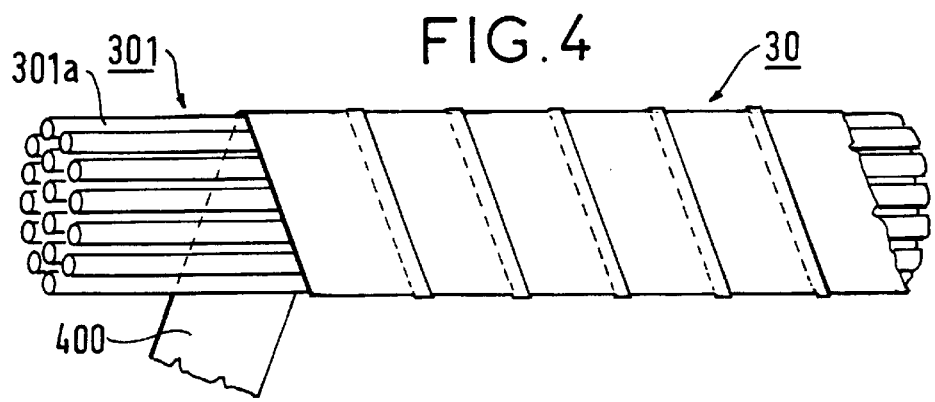
FIG. 4 shows a group of fibers in a second variant of the invention being taped in a film in order to produce an optical fiber module as included in a cable of the type shown in FIGS. 1 or 2.

In a second variant shown in FIG. 4, the film 400 is taped helically around a group of optical fibers 301, leaving no gaps between two successive turns. Two successive turns of the film can be superposed over a fairly large portion of width of the film.

In both variants, the visible outside face of the film which surrounds a group of fibers may include module identification information. Said information can consist of a color, a number, or a bar code enabling the module to be distinguished from other modules. When manipulating modules in the cable, it is thus possible to identify each of the modules. Furthermore, the fibers 301a can be held in the film with or without freedom of movement as a function of the degree of tightness of the film around the fibers, the film being in direct contact with the fibers of the group.

Figure 5:
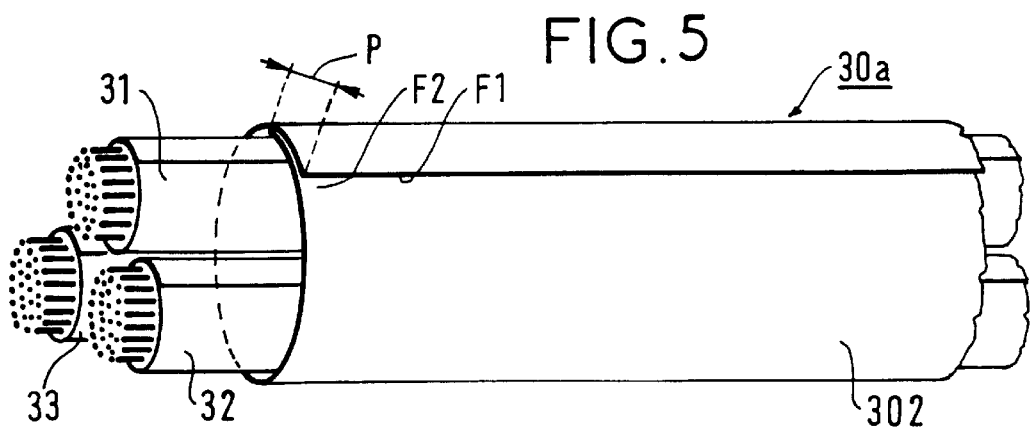
FIG. 5 shows N fiber modules in a first variant of the invention being wrapped in a film in order to produce a complex optical fiber module as included in a cable of the type shown in FIGS. 1 or 2.
Figure 6:
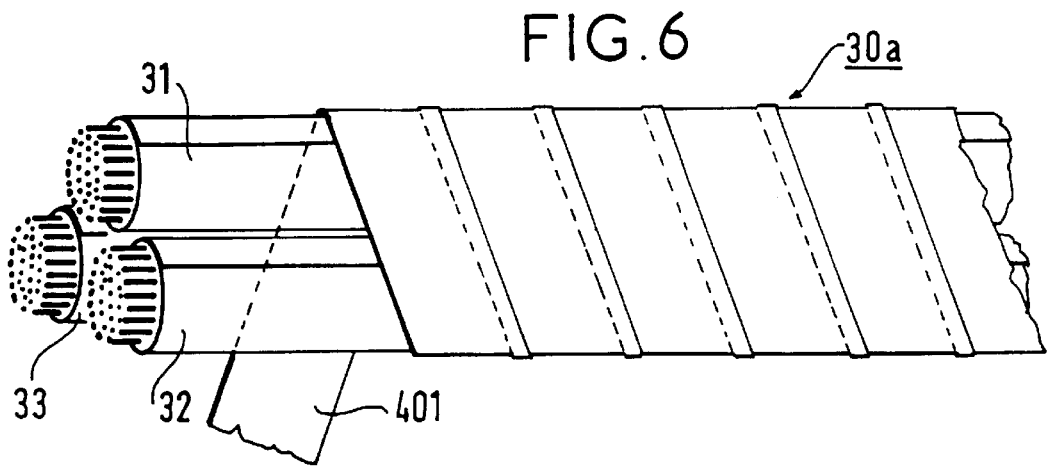
FIG. 6 shows a film in a variant embodiment of FIG. 5 being taped around N optical fiber modules, in order to produce a complex optical fiber module as included in a cable of the type shown in FIGS. 1 or 2.

The invention is not limited only to providing a film surrounding a group of optical fibers, but it also provides for a film to be used for bringing together at least two optical fiber modules, which modules could be of the type described with reference to FIGS. 3 or 4. Compound or complex modules of optical fibers can thus be formed. Two variants are described with reference to FIGS. 5 and 6. In FIG. 5, by analogy with FIG. 3 described above, the compound optical fiber module 30a is obtained by a rectangular-shaped film 302 made of plastics material wrapped widthwise around N=3 optical fiber modules 31, 32, and 33. A first face F1 of the film 302 is superposed on and fixed to an opposite second face F2 of the film over a portion of given width p of the film. The first face F1 is fixed to the second face F2 by adhesive, for example. The fiber modules 31, 32, and 33 can be held in the film with or without freedom of movement. By analogy with the description relating to FIG. 4, in the second variant the compound optical fiber module is obtained by a substantially rectangular-shaped film 401 which is taped helically around N=3 optical fiber modules 31, 32, and 33, leaving no gaps between two successive turns of film. Two successive turns of the film can be superposed over a fairly large portion of width of the film.

Thus, in both variants of compound optical fiber modules, the film is provided to group or bring together at least two optical fiber modules. As in FIGS. 3 and 4, the films 302 and 401 can be provided on their visible outside surfaces with compound module identification information, such as a color, a number or a bar code.

The optical fiber modules 30 or compound optical fiber modules 30a are designed to be disposed inside an outer casing of a cable of the type described in the preamble of the description. Thus, returning to FIGS. 1 and 2 for example, the outer sheath 1 can be formed by one or more concentric sheath elements 10, 12 made of a plastics material. Between two of said sheaths, at least one longitudinal reinforcing element can be provided. In a variant, the outer sheath can be a metal sheath. In addition, a filler material, such as a sealant, can be used to fill the volume inside the outer sheath that is not occupied by the modules.

Inside the outer sheath 1 in the longitudinal direction, a module can be disposed either substantially rectilinearly, or substantially helically, or even substantially in SZ manner.

A complex cable including at least two cables of the type described above is also included in the ambit of the invention. Such a complex cable can use a central reinforcing element.

Figure 7:
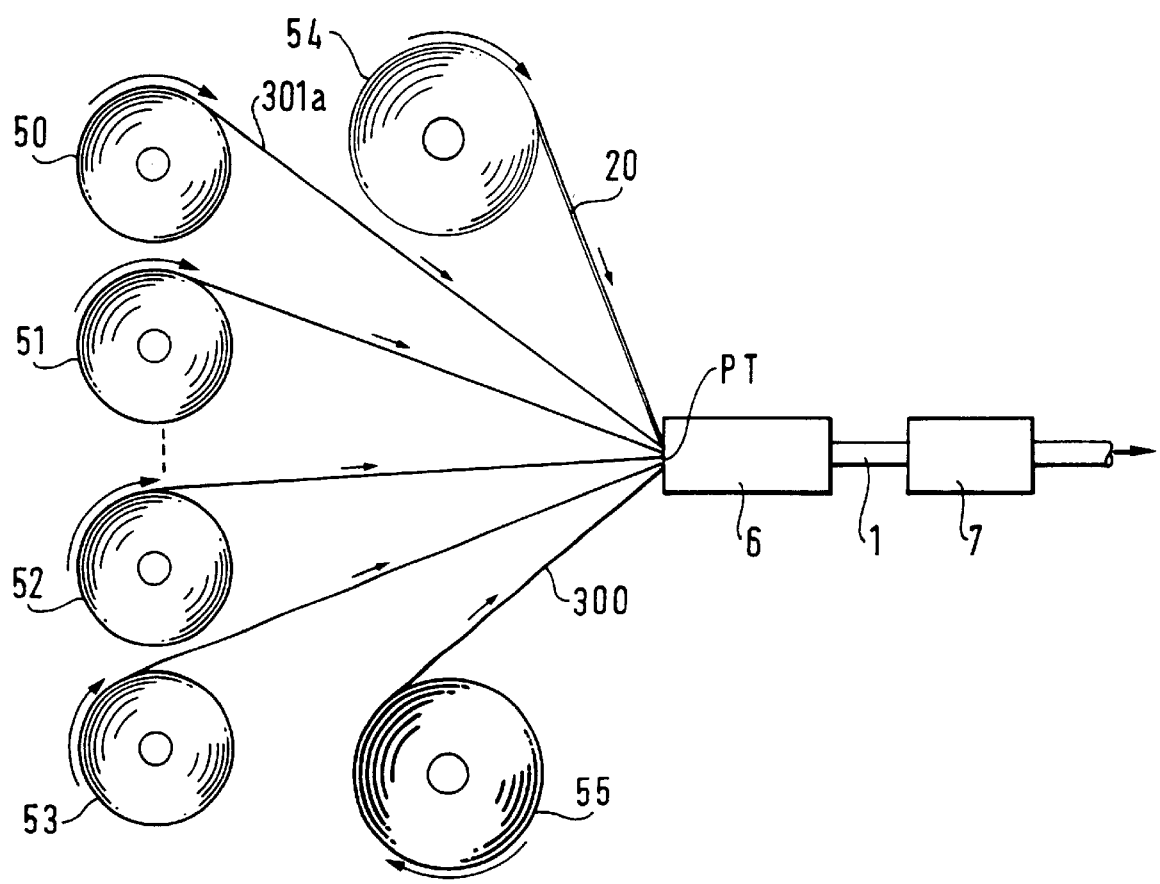
FIG. 7 is a simplified diagram of a system of the invention for manufacturing an optical fiber module.

In order to complete the description of the invention, a method of manufacturing an optical fiber module of the type shown in FIG. 3 is now described with reference to FIG. 7. A system for implementing said method includes N=4 optical fiber storage devices 50, 51, 52, and 53, a synthetic film storage device 55, and a module-forming device 6. In both variants of said method, the system can further include a sealing thread storage device 54, and a heating device 7. All the storage devices 50, 51, 52, 53, 54, and 55 are typically in the form of rolls. The respective optical fibers stored in the rolls 50–53 are pulled towards a convergence point PT which is substantially situated at the inlet of the module-forming device 6, and the film extracted from the device 55 is deformed widthwise around the group of optical fibers in the vicinity of said convergence point PT so that a first face of the film 300 is superposed on a second face of the film over a portion of given width of the film. On the first face of the film 300, over said portion of given width p (FIG. 3) of the film, either a self adhesive material is provided, or an adhesive is introduced so that said first face sticks by adhesion to the second face of the film. Advantageously, the film is made of a heat-shrink material, and after the film has been deformed widthwise around the group of optical fibers in the vicinity of the convergence point PT, the film is heated by the device 7 so that it shrinks around the group of optical fibers.

More generally, the method of forming a sheath for an optical fiber module includes deforming a film around the group of optical fibers, and fixing the film thus deformed around the group of optical fibers in order to surround and hold the group of optical fibers.

The group of optical fibers is typically pulled so that the step of deforming the film is performed at a fixed point. In a first variant, the deforming step consists of deforming the film widthwise around the group of optical fibers, which runs under traction so that a first face of the film is superposed on a second face of the film over a portion of given width of said film.

In another variant, the deforming step consists of helically taping said film around the group of optical fibers which runs under traction.

The step of fixing the film deformed around the group of optical fibers is advantageously obtained by adhesive.

In the case where the film is a heat-shrink material, the fixing step is followed by a step of heating the film so that it shrinks around the group of optical fibers.

Although, in the above description, the modules are composed of a plurality of unitary optical fibers, it will be clear to the person skilled in the art that said optical fibers can, at least in part, be in the form of optical fiber ribbons.

What is claimed is:

1. A method of forming a sheath for an optical fiber module, said module being designed to form part of an optical fiber cable including an outer sheath enclosing at least two optical fiber modules each including a respective group of optical fibers, the method comprising the steps of:

deforming a pre-formed film tightly around said group of optical fibers; and fixing the film thus deformed around the group of optical fibers in order to surround, enclose, and hold said group of optical fibers.

2. A method of forming a sheath an optical fiber module according to claim 1, wherein the deforming step is preceded by the step of:

applying traction to the group of optical fibers, and wherein the deforming step consists in deforming the film widthwise around the group of optical fibers, which runs under the applied traction so that a first face of said film overlaps a second face of said film over a portion of given width of said film.

3. A method of forming a sheath an optical fiber module according to claim 1, wherein the deforming step is preceded by the step of:

applying traction to the group of optical fibers, and wherein the deforming step consists in helically taping said film around the group of optical fibers which runs under the applied traction.

4. A method according to claim 1, wherein the step of fixing the film deformed around the group of optical fibers is obtained by adhesive.

5. A method according to claim 1, wherein the film is a heat-shrink material, and wherein the fixing step is followed by a heating step during which the film is heated so that it shrinks around the group of optical fibers.

6. A method according to claim 1, wherein said film has a thickness in a range of 5 $\mu$m to 150 $\mu$m.

7. An optical fiber cable including an outer sheath containing a plurality of optical fibers separated into at least two optical fiber modules, each of said modules comprising a respective group of said optical fibers and a film of plastics material wrapped around the respective fiber group with portions of said film overlapping other portions of said film to form a module sheath tightly wrapping and enclosing said respective group of optical fibers.

8. A cable according to claim 7, wherein said film is wrapped widthwise around the group of optical fibers, a first face of said film being superposed on and fixed to a second face of said film over a portion of given width of said film.

9. A cable according to claim 8, wherein said first face of the film is fixed by adhesion to said second face of the film over said portion of given width.

10. A cable according to claim 7, wherein said outer sheath comprises a film wrapped helically around said two optical fiber modules so as to substantially completely cover said optical fiber modules.

11. A cable according to claim 7, wherein said film is a heat-shrink material which is shrunk by being heated.

12. A cable according to claim 7, including module identification information on an outside face of the film.

13. A cable according to claim 7, wherein each of said modules is disposed substantially rectilinearly inside the outer sheath.

14. A cable according to claim 7, wherein each of said modules is disposed substantially helically inside the outer sheath.

15. A cable according to claim 7, wherein each of said modules is disposed substantially in SZ manner inside the outter sheath.

16. A cable according to claim 7, wherein said outer sheath is formed by one or more concentric sheath elements made of a plastics material.

17. A cable according to claim 16, including two concentric sheath elements, and at least one reinforcing element disposed between said two sheath elements.

18. A cable according to claim 7, wherein said outer sheath is a metal sheath.

19. A cable according to claim 7, including a filler material filling a volume inside the outer sheath that is not occupied by said at least two modules.

20. A cable according to claim 19, wherein said filler material is a sealant.

21. A compound optical fiber cable, including at least two cables, each cable being according to claim 7.

22. A cable according to claim 7, wherein each said film has a thickness in a range of 5 $\mu$m to 150 $\mu$m.

* * * * *